United States Patent [19]

Kurokawa et al.

[11] Patent Number: 4,835,070
[45] Date of Patent: May 30, 1989

[54] MAGNETIC RECORDING MEDIUM AND METHOD OF PRODUCING THE SAME

[75] Inventors: Hideo Kurokawa, Katano; Tsutomu Mitani, Neyagawa; Kazuo Yokoyama, Hirakata; Taketoshi Yonezawa, Ibaraki, all of Japan

[73] Assignee: Matsushita Electric Industrial Co., Ltd., Osaka, Japan

[21] Appl. No.: 772,629

[22] Filed: Sep. 4, 1985

[30] Foreign Application Priority Data

Sep. 5, 1984 [JP] Japan ................................. 59-185802

[51] Int. Cl.⁴ ............................................... G11B 5/64
[52] U.S. Cl. ......................................... 428/64; 427/41; 427/131; 428/336; 428/694; 428/695; 428/900
[58] Field of Search ............... 428/694, 695, 400, 336, 428/64; 427/41, 131

[56] References Cited

U.S. PATENT DOCUMENTS

| | | | |
|---|---|---|---|
| 4,390,562 | 6/1983 | Nippon | 428/900 |
| 4,419,404 | 12/1983 | Arai | 427/41 |
| 4,429,024 | 1/1984 | Veno | 427/41 |
| 4,495,242 | 1/1985 | Arai | 428/693 |
| 4,565,734 | 1/1986 | Arai | 427/41 |
| 4,582,746 | 4/1986 | Shirahata | 427/131 |
| 4,636,435 | 1/1987 | Yanagihara | 428/422 |

FOREIGN PATENT DOCUMENTS

| | | | |
|---|---|---|---|
| 59-160828 | 9/1984 | Japan | 428/694 |
| 171028 | 9/1984 | Japan . | |

Primary Examiner—Paul J. Thibodeau
Attorney, Agent, or Firm—Spencer & Frank

[57] ABSTRACT

A magnetic recording medium has a non-magnetic substrate, a magnetic layer formed on the surface of the substrate containing a ferromagnetic material, and a protective film formed on the magnetic layer. The protective film is constituted by a singular layer of continuous or dispersed molecular structures in which carbon and an element constituting the magnetic layer are bonded directly or indirectly through oxygen and at least one fluorine is bonded to the carbon. This magnetic recording medium can be produced by a method comprising preparing a substrate of a non-magnetic material, forming a magnetic layer of a ferromagnetic material on the surface of the substrate, and forming, by a plasma CVD method, a protective film of a fluorine-containing molecular body having a thickness not greater than a value equivalent to 5 Å on the surface of the magnetic layer.

12 Claims, 3 Drawing Sheets

MAGNETIC RECORDING MEDIUM AND METHOD OF PRODUCING THE SAME

BACKGROUND OF THE INVENTION

1. Field of the Invention

The present invention relates to a magnetic recording medium suited for use in recording and playback of signals, such as audio signals, video signals and data signals, and also to a method of producing such a magnetic recording medium.

2. Description of the Prior Art

In recent years, there has been a trend for reduction in the size and weight of audio and visual magnetic recording and playback devices, and the recording density has been increasing year by year. On the other hand, studies have been made for development of perpendicular magnetic recording systems in order to attain higher recording density. Studies have been made also for development of recording medium in which a thin film or layer of a magnetic material is formed on a substrate by a vapor deposition method, such as evaporation, sputtering or other known measure (such types of medium will be referred to as "vapor-deposited medium", hereinafter), besides the coating-type medium in which a magnetic layer is formed by coating a magnetic material in the form of a mixture with a binder.

FIG. 4 is a sectional view of a vapor-deposited medium. As will be seen from this Figure, the vapor-deposited medium has a substrate 1 made of, for example, polyethylene, a magnetic layer 2 consisting mainly of a magnetic material, such as Co, Cr, Ni or the like, and a protective layer 3. The surface of the substrate 1 remote from the magnetic layer 2 may have been subjected to a back coating treatment or a back surface treatment in order to improve the running performance.

A description will be made hereinafter of a as to the conventional vapor-deposited medium. In order to allow an efficient use of the magnetic characteristics of the materials, such as Co, Cr, Ni and Fe, the magnetic layer 2 is formed directly on the substrate 1 by a vapor deposition method, such as evaporation, sputtering or the like, rather than by coating the magnetic material in the form of a mixture with a binder. Therefore, the surface of the magnetic layer 2 is made only of a metal or a metal oxide, so that, when the recording medium is used in an audio tape recorder, video tape recorder (VTR), floppy fisk drive (FDD), etc. a large friction is caused between the magnetic head guide roller and the magnetic layer 2. This friction in turn causes wear or damage of the magnetic layer 2 and the magnetic head and the guide roller, as well as noises due to a stick slip. In order to avoid these problems, hitherto, it has been proposed to reduce the friction between the magnetic layer 2 and the stationary parts, such as the magnetic head and the guide roller, by covering the magnetic layer 2 with a protective film 3 having a lubricating effect or by suitably selecting the surface roughness of the magnetic layer 2.

Two types of methods have been proposed for the purpose of forming the protective film 3: namely, a method called "wet process" and a method called "dry process". In the wet process, a lubricant dissolved in a solvent is applied to the magnetic layer 2 and then the solvent is evaporated by, for example, heating, so as to leave a lubricant protective film 3 on the magnetic layer 2. On the other hand, in the dry process, the protective film 3 is formed by depositing a lubricant directly on the magnetic layer 2 by, for example, evaporation, sputtering, plasma CVD and so forth, without using any solvent. In the conventional dry process, the lubricant is in most cases an organic one and the thickness of the protective film usually ranges between 50 and 1000 Å, as reported in Japanese Patent Unexamined Publication Nos. 154643/1984, 35331/1985, 171029/1984, 213031/1984, 102330/1983 and 135440/1982. The conventional magnetic recording films with protective films, however, have suffered from the following disadvantges.

Referring first to the protective film formed by the wet process, the protective film tends to have island-type construction when the film thickness is small, because the film is formed by evaporating the solvent in which the lubricant is dissolved. This means that the magnetic layer 2 is partially uncovered so as to cause a large friction in the portions where the magnetic layer 2 is uncovered. Such a protective film is quite unsatisfactory from the view points of wear and corrosion resistance. The protective film formed by the wet process, therefore, should have a thickness not smaller than 200 Å, resulting in a large space loss. When the recording wavelength of information is 0.9 μm, the playback loss is as large as about 1.6 dB when the thickness of the protective film is 200 Å. The playback loss is much greater in a device of the perpendicular recording type which is intended for higher recording density. The wet process involves further disadvantages such as impossibility of application of some types of lubricant due to a repellent effect on the surface of the magnetic layer 2. In addition, when the film thickness is as large as 200 Å, the lubricant tends to come off and may be deposited on portions around the magnetic head, resulting in troubles such as clogging and drop out. The wet process also involves a risk of contamination by foreign matter and dust transferred from air and tools, resulting in defective products.

The dry process is superior and more promising than the wet process from the view point of contamination prevention and uniformity of the film. It is reported that the protective film formed by the dry process, mainly consisting of hydrocarbon and organic material containing hydrocarbon, has to have a thickness of 50 Å or more from the view point of wear resistance. Such a large film thickness increases the tendency for the lubricant to come off and to be deposited to the area around the magnetic head, resulting in clogging and drop out, as in the case of the protective film formed by the wet process.

The conventional dry process also encounters problems such as difficulty in the control of the properties of the film and poor reproducibility. In addition, this process is not suited to mass-production because the film forming speed is much lower than that of the wet process.

SUMMARY OF THE INVENTION

Accordingly, an object of the invention is to provide a magnetic recording medium in which the friction coefficient is reduced and the wear resistance is improved in the surface, while minimizing the reduction in the output power due to the presence of the protective film, as well as a method of producing such a magnetic recording medium, thereby overcoming the above-described problems of the prior art.

To this end, according to one aspect of the invention, there is provided a magnetic recording medium comprising a substrate of, for example, polyester, a magnetic layer formed on the substrate and consisting mainly of a ferromagnetic material such as Co, Cr, Ni, Fe or the like, and a singular-layered film of a fluorine-containing molecule, i.e., fluorine-containing molecules having a film thickness not greater than 5 Å, formed on the surface of the magnetic material by the plasma polymerization method.

Through an intense study, the inventors have found that a magnetic recording medium with a small friction coefficient and superior wear resistance is obtainable by using, as the protective film, a singular-layered film of fluorine-containing molecules, i.e., fluorine-containing molecules having a thickness of not greater than 5 Å. While a large film thickness tends to increase the risk of the film coming off due to, for example, friction with respect to the head resulting in troubles such as clogging and drop out, the singular-layered fluorine-containing molecules exhibit a greater durability against wear because the film material's molecules make a substantially singular-molecular bond to the surface of the magnetic layer. At the same time, the friction coefficient is decreased by virture of containment of the fluorine.

The fluorine-containing molecular protective film, a film thickness of not greater than 5 Å, can be formed effectively by a plasma CVD method which is preferably conducted under the following condition for attaining high plasma controllability and stability. Namely, the plasma CVD method is carried out by perfectly separating the plasma generating section from the magnetic recording medium forming section. The plasma generating section generates a plasma which contains ion nuclei, neutral nuclei, radical nuclei and electrons, and the plasma is blown against the surface of the magnetic layer, thereby forming the protective film.

BRIEF DESCRIPTION OF THE DRAWING

The above and other objects, features and advantages of the invention will become clear from the following description of the preferred embodiment when the same is read in conjunction with the accompanying drawing.

DESCRIPTION OF THE PREFERRED EMBODIMENT

Figure 3:
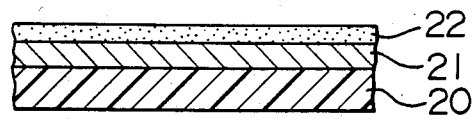
FIG. 3 is a sectional view of a magnetic recording medium in accordance with the invention.
Figure 4:
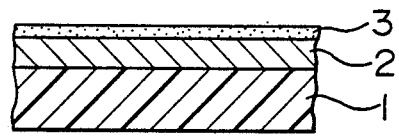
FIG. 4 is a sectional view of a conventional magnetic recording medium.

FIG. 3 is a sectional view of a magnetic recording medium in accordance with the invention. The construction of this magnetic recording medium is substantially the same as that of the conventional recording medium shown in FIG. 4, but is distinguished from the conventional medium by the fact that the protective film is made of a fluorine-containing singular-layered film having a thickness of not greater than 5 Å, as well as by the production method.

It is practically impossible to measure the thickness of the protective film consisting of fluorine-containing molecule having a thickness of not greater than 5 Å. According to the invention, therefore, the protective film is experimentally formed while the recording medium is maintained stationary, and therefore the film forming speed and the film area may be determined. Using these data, the mean thickness of the protective film formed on a running medium is calculated by determining the film forming time from the medium running speed and the medium area, and then determining the film thickness from the film forming time and the film forming speed.

The values of film thickness mentioned hereinafter, unless they exceed 20 Å, are the values which are calculated by the above-explained method. Film thicknesses exceeding 20 Å are measurable by means of an ellipsometer, so that actually measured values apply to such large thicknesses.

Figure 1:
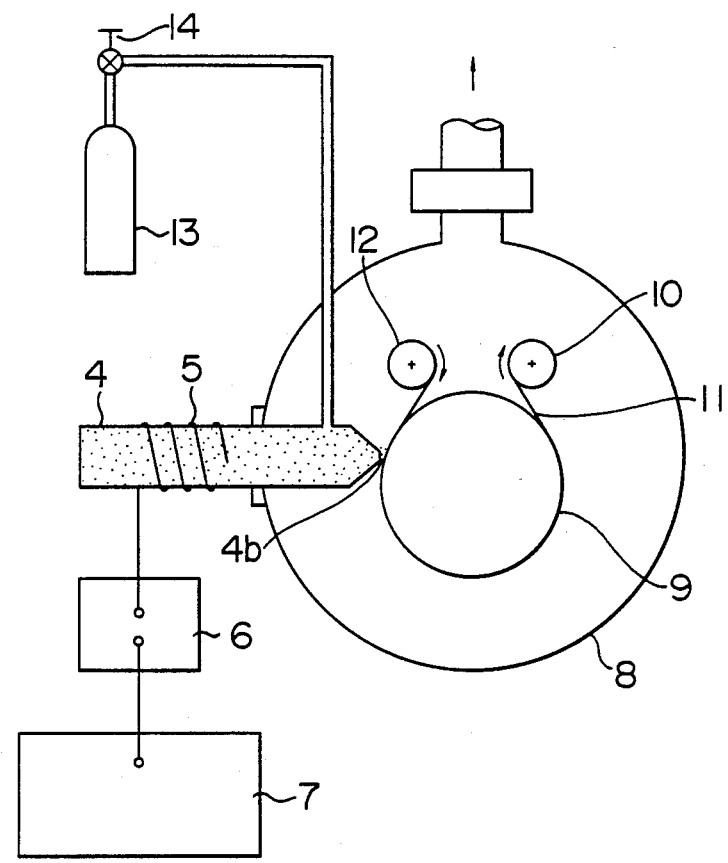
FIG. 1 is a schematic illustration of a plasma CVD apparatus for forming a fluorine-containing organic protective film on a magnetic recording medium in accordance with the invention.

FIG. 1 schematically shows an example of the apparatus suited for use in the formation of the fluorine-containing molecular protective film. The magnetic recording medium is adapted to run on a driving system which is composed of a pay-off roller 12, can roller 9 and a take-up roller 10 arranged in a vacuum vessel 8. The vacuum vessel 8 accommodates also a plasma tube 4 which carries at its end a plasma outlet 4b arranged to oppose a magnetic layer 2 on a magnetic recording medium 11. A monomer gas is introduced into plasma tube 4 from a monomer cylinder 13 through a needle valve 14 which is capable of adjusting the flow rate. The discharge is commenced as an exciting coil 5 around the outer periphery of the plasma tube 4 is supplied with high-frequency power from a high-frequency power supply 7 through a matching device 6. A plasma formed as a result of the discharge is blown from plasma outlet 4b against the surface of the magnetic layer 2 due to the pressure differential between the plasma tube 4 and the vacuum vessel 8, so that a polymeric film is formed on the magnetic layer by the action of radical nuclei and ion nuclei which exist in the plasma.

Figure 2:
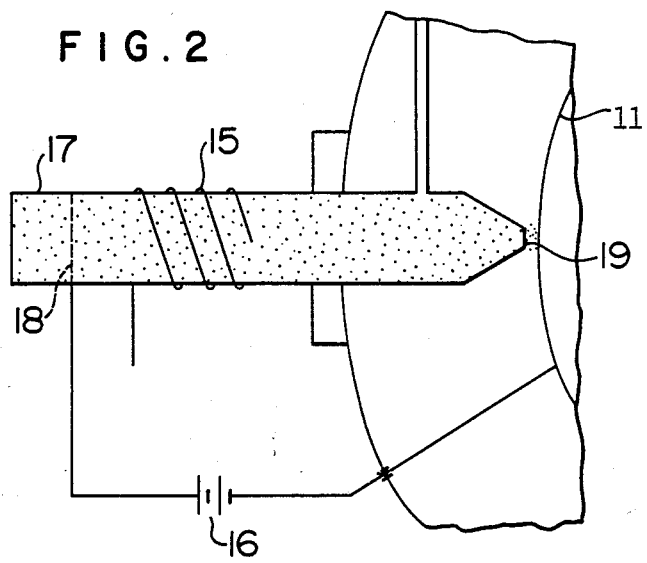
FIG. 2 is a partly enlarged view of a plasma CVD apparatus of the invention.

The blowing of plasma will become more effective if a suitable means is employed for accelerating the ion nuclei in the plasma, besides the utilization of the pressure differential between the plasma tube 4 and the vacuum vessel 8. FIG. 2 schematically shows a plasma tube 16 with an ion nuclei acceleration means. An electric field is applied by a D.C. power supply 16 between an electrode 18 disposed in a plasma tube 17 and the magnetic layer 2 on magnetic recording medium 11, such that the electrode 18 constitutes an anode. The ion nuclei in the plasma produced as a result of application of a high-frequency wave to an exciting coil 15 is accelerated towards the magnetic layer 2 by this electric field. The accelerated ion nuclei collide with other types of nuclei, such as the radical nuclei and neutral nuclei in the plasma so that the plasma is accelerated and blows out from the plasma outlet 19 with a high degree of efficiency thereby promoting the formation of the film.

In the plasma CVD method, the monomer gas is decomposed into radicals which then rebond, so that this method makes it possible to form a film of such an extremely small thickness as could never be attained by the coating type method, and can be applied to materials having poor wettability, e.g., fluorine-containing organic matter. In addition, the film exhibits a large affinity for the magnetic layer because the film is formed in an active state.

Fluorine-containing molecular protective films of various thicknesses were formed by employing $C_4F_8$ (octafluorcyclobutane) on a vapor-deposited tape having a magnetic layer which is composed of Co, Ni and their oxides, thus forming test magnetic recording tapes. These test tapes were subjected to a running durability test conducted by using a video tape deck equivalent to an 8 m/m video tape recorder sold by Kodak. The result of this test is shown in Table 1 below.

TABLE 1

Relationship Between Protective Film Thickness and Running Durability

| Protective film thickness Å | Contact angle (deg.) | Number of repetitional running cycles | Clogging and drop out (time/min) |
|---|---|---|---|
| Untreated 0 | 65 | 2–3 passes | 1–2 |
| 2–3 | 90–95 | 5–100 | 1–2 |
| 5 | 100–110 | 100 or more | 1–2 |
| 20 | 110 | 100 or more | 50 |
| 100 | 110 | 100 or more | 230 |

Note:
Number of repetitional running cycle is the number of passes of repetitional running of the vapor-deposited tape on the deck under the condition of 20° C. and 10% RH, sustained by the tape until the tape exhibits a 3 dB reduction of output power. Contact angle means the angle formed between a solid wall and the free surface of a stationary liquid contacting the wall.

From Table 1, it will be seen that untreated vapor-deposited tape exhibits more than 3 dB of output reduction after only 2 to 3 passes, whereas the vapor-deposited tape with fluorine-containing protective film withstood more than 50 to 100 passes of repetitional running. However, the risk of occurrence of troubles such as clogging of head and drop out is closely related to the thickness of the fluorine-containing molecular protective film. Namely, the frequency of occurrence of clogging of head and drop out is drastically increased when the film thickness is increased beyond 20 Å. In fact, clogging of head is caused immediately after the start of running when the protective film thickness is as large as 100 Å.

The magnetic layer of the vacuum-deposited tape is composed of Co and Ni, and, in the surface region, these constituents take the form of oxides or hydroxides such as Co-O and Co-OH. In the initial stage of formation of the fluorine-containing molecular protective film on this magnetic layer by plasma CVD method using, for example, $C_4F_8$ gas as the monomer gas, the magnetic layer surface is activated by the plasma and the fluorine-containing radicals such as $CF_2$ and CF, in the plasma are strongly bonded thereto to form a singular molecular layer such as, for example,

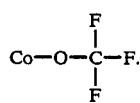

Other possible forms of the singular molecular layer are single molecular bonding such as, for example,

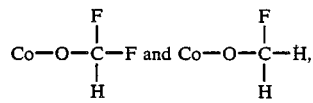

and molecular layers such as, for example,

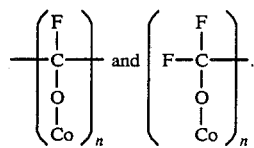

However, all that is required for the construction of the molecular layer is that the fluorine element is bonded, and it is not always necessary that the molecular layer have a regularity of molecular construction. The molecular layer also can have double bonding.

According to the invention, the protective film is preferably a singular molecular layer, although the invention does not exclude such a construction that bonds similar to singular molecular bonds are dispersed at intervals greater than the molecular size of water. If the bonds are dispersed at intervals greater than the molecular size of water, water cannot be perfectly removed, resulting in a problem concerning rust of the magnetic layer. The dispersion of bonds at intervals smaller than the molecular size of water cannot be attained by conventional application methods, and is possible only with the plasma polymerization method as proposed by the invention. The molecular layer and bonds similar to singular molecular bonds may co-exist in the film and such a film can be used as the protective film of the recording medium in accordance with the invention if the above-explained conditions are met.

As the plasma is blown further, a fluorine-containing molecular layer having structures such as $-(CF_2)_n-$ and $-(CF_2-CHF)_n-$ are formed on the singular molecular film.

Figure 5:
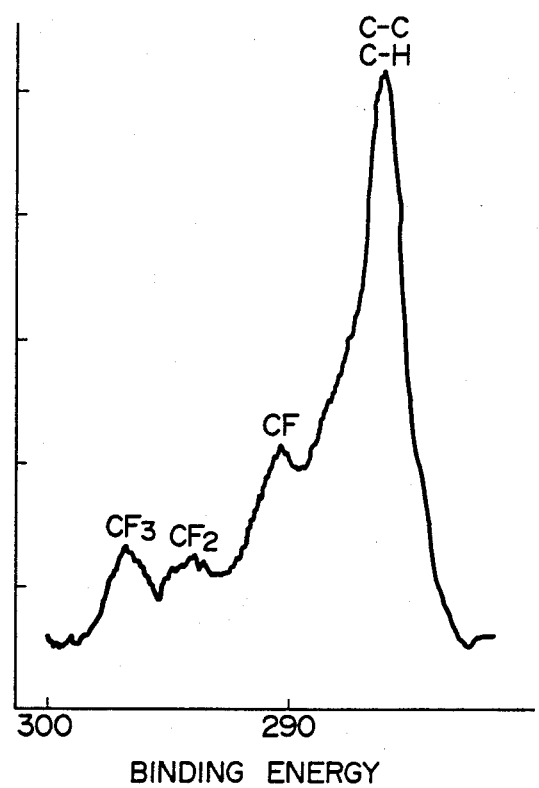
FIG. 5 is a diagram showing the result of an ESCA analysis test on the surface of a magnetic recording medium in accordance with the invention.

FIG. 5 shows the result of an X-ray optoelectron spectral analysis of the surface of the protective film having a thickness equivalent to 5 Å. Peaks indicating the presence of CF, $CF_2$ and $CF_3$ are observed even in this film having the thickness equivalent to 5 Å, thus proving the presence of fluorine. CH and CC exhibit greater peaks than CF, $CF_2$ and $CF_3$. This may be attributed to the detection of C—H and C—C deposited on the film surface after film formation, as well as to C—H and C—C existing on the surface of the magnetic layer before the formation of the film, besides the CH and CC structures existing in the film itself.

The contact angle of the fluorine-containing molecular protective film is closely related to the amount of fluorine existing in the film surface. That is, the contact angle is increased as the amount of fluorine existing in the film surface is increased so as to improve the running performance and running durability.

Figure 6:
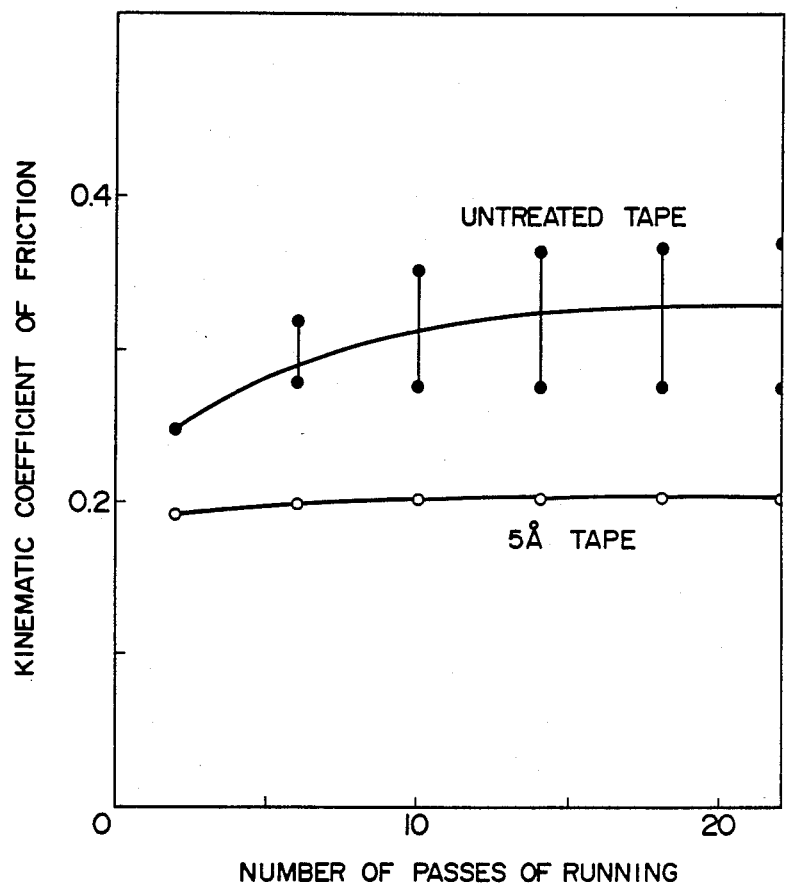
FIG. 6 is a diagram showing the kinematic coefficient of friction exhibited by the magnetic recording medium of the invention during repetitional running and stopping.

FIG. 6 shows the kinematic coefficient of friction $\mu$ exhibited by vapor-deposited tape on which is formed a fluorine-containing protective film of a thickness equivalent to 5 Å. In the case of untreated tapes, the kinematic coefficient of friction becomes unstable as the number of passes of running is increased so as to cause a stick slip, whereas the tapes with protective films of thicknesses equivalent to 5 Å stably showed kinematic coefficient of friction of 0.2.

The contact angle of the protective film ranges between 100° and 110° when the film thickness is equivalent to 5 Å, and the film having such a contact angle exhibits a superior running durability. The contact angle, therefore, can be used as an index of the running stability and running durability. It has been confirmed that a sufficient running durability is obtainable when the contact angle exceeds 100°.

It is considered that, when the thickness of the protective film is equivalent to 5 Å, the film is constituted solely of a singular molecular layer, such as, of

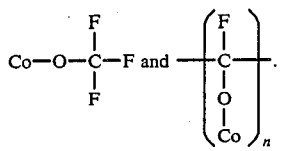

In this case, therefore the bond between the magnetic layer and the protective film is very strong, so that wear and coming off of the protective film are reduced when used in sliding contact with the head and guide posts, so that the product vapor deposited tape exhibits a superior running durability with reduced tendency of clogging and drop out. In contrast, the protective film having a thickness in excess of 20 Å suffers from the following disadvantages. Namely, in such a thick film, although a strong bonding between the magnetic layer and the protective film is obtained at the interface therebetween by virture of the presence of structures such as,

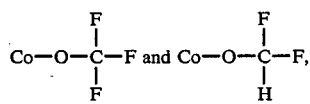

the fluorine-containing molecular protective film having structures such as, $-(CF_2)_n-$ and $-(CF_2-CHF-)_n-$, formed on the structures at the interface, exhibit only a small bonding force. In consequence, the fluorine-containing molecular protective film partially comes off when the tape is used in sliding contact with the head and the guide posts, resulting in troubles such as clogging and drop out. Therefore, when the film thickness is increased beyond a value equivalent to 5 Å, the tendency of clogging and drop out is increased as the film thickness becomes greater. In order to meet both the requirement for high running durability and the requirement for prevention of clogging and drop out, it is necessary that the thickness of the protective film is not greater than a value equivalent to 5 Å. As stated before, however, it is practically impossible to form such a thin film by conventional coating methods, and can be conducted successfully only by the plasma CVD method as suggested by this invention. As mentioned above, although the protective film, which is the fluorine-containing molecule singular layer, remarkably improves the travelling durability of a magnetic recording medium including a metallic magnetic layer, general common measures may be used in order to improve the practical characteristics of the magnetic recording medium. For example, the coating of a lubricant on the protective film by which the travelling resistance of the magnetic recording medium under a specific environmental condition such as, for example, a high temperature and high humidity condition, a low temperature and high humidity condition, etc. is reduced, further enhances the basic advantages of the present invention. The lubricant may be selectively used appropriately for the condition and methods of using the magnetic recording medium.

As has been described, the invention provides a magnetic recording medium and a method of producing the same, wherein a protective film constituted by a singular layer film of fluorine-containing molecular bodies, i.e., fluorine-containing molecular bodies having a film thickness not greater than a value equivalent to 5 Å, is formed on the magnetic layer of a ferromagnetic material formed on a non-magnetic substrate, thereby attaining a magnetic recording medium which has a superior wear resistance and which suffers from only a small friction coefficient and reduction in the output power despite the presence of the protective film. The formation of the protective film is conducted by a plasma polymerization method in which the plasma is generated in a vacuum vessel separate from the section where the magnetic recording medium is placed. With this arrangement, a stable control of generation of plasma is attained to offer various practical advantages.

What is claimed is:

1. A magnetic recording medium comprising a non-magnetic substrate, a magnetic layer formed on the surface of said substrate and comprised of a ferromagnetic material containing at least one ferromagnetic element, and a protective film formed on said magnetic layer, said protective film having a mean thickness not greater than 5 Å, and being comprised of a fluorine-containing carbon compound having a molecular structure in which carbon is bonded to one of said at least one ferromagnetic element and oxygen, which oxygen is present as a surface oxide or hydroxide and is bonded to said at least one ferromagnetic element, and at least one fluorine is bonded to said carbon.

2. A magnetic recording medium according to claim 1, wherein said substrate is a plastic member in the form of a tape.

3. A magnetic recording medium according to claim 1, wherein said substrate is a plastic member in the form of a disk.

4. A magnetic recording medium according to claim 1, wherein said substrate is a metallic member in the form of a disk.

5. A magnetic recording medium according to claim 1, wherein said substrate is a glass member in the form of a disk.

6. A magnetic recording medium according to claim 1, wherein said molecular structure is one of a continuous structure and a plurality of dispersed molecular structures.

7. A magnetic recording medium according to claim 1, wherein the surface of said protective film has a contact angle which ranges from 100 to 110 degrees.

8. A method of producing a magnetic recording medium comprising preparing a substrate of a non-magnetic material, forming a magnetic layer comprised of at least one ferromagnetic element on the surface of said substrate, and forming, by a plasma CVD method, a protective film of a fluorine-containing carbon compound having a molecular structure in which carbon is bonded to one of said at least one ferromagnetic element and oxygen, which oxygen is present as a surface oxide or hydroxide and is bonded to said at least one ferromagnetic element, and having a mean thickness not greater than 5 Å on the surface of said magnetic layer.

9. A method of producing a magnetic recording medium according to claim 8, wherein said plasma CVD method is carried out by using a system having two separate vacuum vessels such that a fluorine-containing organic gas or a mixture of a fluorine-containing organic gas and an inert gas is excited into the state of plasma, which plasma contains ion nuclei, radical nuclei of respective elements and mixture elements of said gas or said mixture, neutral nuclei, and electrons, in one of said vacuum vessels, said plasma being blown through a plasma blowing means onto the surface of said magnetic layer of said recording medium placed in the other of said vacuum vessel.

10. A method of producing a magnetic recording medium according to claim 9, wherein said plasma blowing means makes use of a pressure differential between the two vacuum vessels, which pressure differential is effective to blow plasma from a plasma tube onto the surface of said magnetic layer of said recording medium.

11. A method of producing a magnetic recording medium according to claim 9, wherein an electric potential difference is employed for accelerating said ion nuclei in the plasma and is provided between said plasma and said recording medium.

12. A method of producing a magnetic recording medium according to claim 10, wherein an electric potential difference is employed for accelerating said ion nuclei in the plasma and is provided between said plasma and said recording medium.

* * * * *